Figures 1, 2:
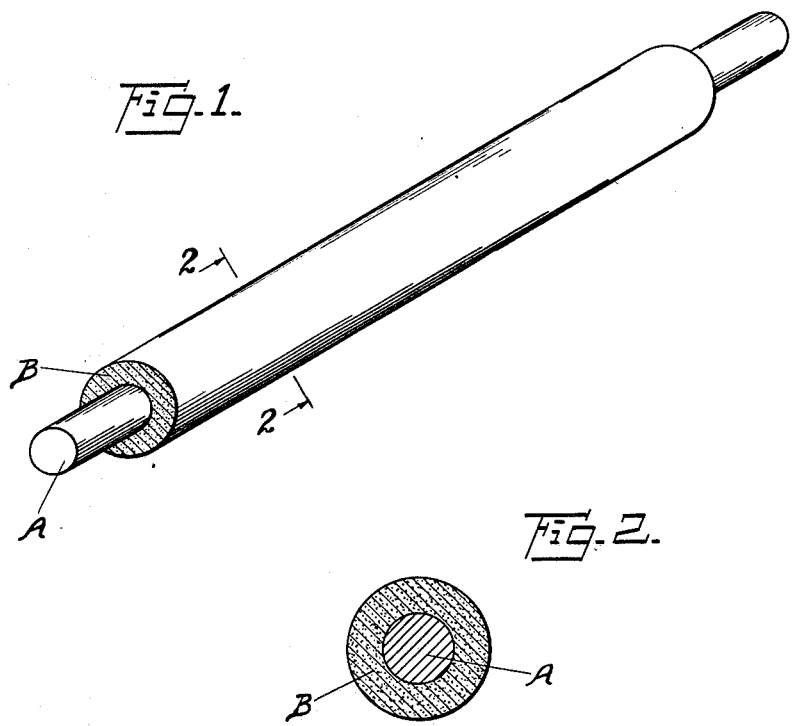

Dec. 1, 1936.   R. S. JOHNSTON   2,062,457
COATED WELDING ROD
Filed Jan. 14, 1936

INVENTOR.
Robert S. Johnston
BY
Philip Sawyer
ATTORNEYS

UNITED STATES PATENT OFFICE 2,062,457

COATED WELDING ROD

Robert S. Johnston, Yardley, Pa., assignor to John A. Roebling's Sons Company, Trenton, N. J., a corporation of New Jersey Application January 14, 1936, Serial No. 59,039

6 Claims. (Cl. 219—8)

This invention relates to coated welding rods.

With the increasing use of electric welding there has arisen a demand for a rod that will produce a weld whose weld metal will have a tensile strength at least as high as 65,000 pounds per square inch, and preferably more than 70,000 pounds per square inch, with an elongation of over 10 per cent in two inches, these results to be accomplished in all positions of welding, such as overhead, vertical or flat welding. Welding rods have been provided which will give a deposited weld metal of the required high tensile strength but with elongation lower than desired, and in a few cases where welding rods have been satisfactory from the standpoint of tensile strength or elongation of weld metal they have been either unsatisfactory for overhead welding, relatively expensive on account of the high cost of special ingredients employed, or have not been economical in the amount of electric energy consumed.

It is the object of the present invention to provide a coated welding rod which, while giving the desired high grade of weld metal, will be suitable as an all-position welding rod, economical in first cost and in operation, and which will give a very quiet and steady arc.

With these general objects in view and some others which will be apparent to those skilled in the art from the description hereinafter, the invention consists in a welding rod having a coating of special composition as more fully explained hereinafter, in connection with the accompanying drawing, in which:

Fig. 1 is a perspective view of a coated welding rod embodying the invention and, Fig. 2 a cross-section of the same rod taken on the line 2—2 Fig. 1.

In these figures, A is the metal rod which serves as the core of the weld rod, or electrode, and B is the coating.

The core A, in order to obtain the desired results, should be of steel having a relatively low carbon content, that is with carbon below ½ percent and in some embodiments of the invention the carbon may be kept still lower, for example, down to 0.10 percent, though in the best form of the invention carbon should range from 0.14 to 0.18 percent and in general is supplied to the user at about 0.16 percent.

Also it has been found that the best results are obtained with a core A containing an appreciable amount of manganese which should be not lower than 0.30 percent and not higher than 0.60 percent. The most satisfactory results have been attained by keeping the manganese within the range from 0.40 to 0.50 percent.

A further important requirement for the metal of the core A is that its silicon content should be as low as can be obtained in commercial practice with proper care. In the best embodiment of the invention the silicon is kept so low that it may be designated as a mere trace.

With a core of the kind hereinbefore described, the coating composition contains certain essential materials as hereinafter set forth and may also contain some additional material or materials which for some purposes is or are highly advantageous, as will be pointed out.

The essential materials are ilmenite, silicon dioxide, cellulose, manganese dioxide, and ferromanganese. A certain relationship of proportions exists between the silicon dioxide and the ilmenite. The sum total of these two materials should not be appreciably less than 40 percent nor materially more than 55 percent of the dry mixture which is first prepared. The silicon dioxide may vary from about 10 percent to 25 percent and the ilmenite, of course, will vary inversely from about 15 percent to 40 percent, that is to say, as the silicon dioxide is increased, the ilmenite is desired. Both materials, of course, are to be finely comminuted. The cellulose is to be in finely comminuted condition and any type of such material may be employed, although one that is as near to pure cellulose as can be obtained commercially is most advantageous, because avoiding the introduction of unwanted impurities which may or may not affect the arc or the weld metal. The proportion of cellulose varies from about 10 percent up to and including 14 percent of the dry materials. The manganese dioxide, also in finely comminuted condition, varies from about 14 percent to about 20 percent of the total dry materials.

The additional materials are asbestos, black oxide of iron ($Fe_3O_4$) and a special scavenger, such as lithium compound.

While a coating composition containing only the above-mentioned essential materials is very satisfactory, it has been found that the addition of a small amount of good chrysotile asbestos in comminuted form improves the slag which is deposited on the weld metal, and also aids in preventing cracking of the coating above the arc during the welding. When used, it is employed to the extent of about 4 percent to 6 percent, and the proportion of ilmenite is cut down.

If black oxide of iron is employed it is added in comminuted form to the extent of about 12 percent to 16 percent and most advantageously about 15 percent. When both the asbestos and the black oxide of iron are used, the percentage of ilmenite is still further reduced.

The following table gives four advantageous compositions of dry mixtures for making coatings, that of column 4 being by far the best for general work, and is the preferred mixture, although it will still be improved by the addition of a very small amount of lithium compound, particularly calcium-lithium alloy, the compound being used in such proportion as to give about 2 to 5 percent of lithium in the dry mixture. Where the usual calcium-lithium alloy is used it is added to the extent of about 4 to 10 percent because the alloy usually contains about 50% of each constituent metal. This slight addition of alloy is too small to materially alter the proportions set forth in column 4. The lithium improves the action of the arc to some extent and also is valuable as a scavenger and probably tends to shield the weld metal against the action of the nitrogen of the air.

The table is as follows:

|  | 1 | 2 | 3 | 4 |
|---|---|---|---|---|
| $SiO_2$ | 25 | 10 | 25 | 24 |
| $MnO_2$ | 15 | 20 | 15 | 14 |
| Ferro-manganese | 15 | 20 | 15 | 14 |
| Cellulose | 10 | 10 | 10 | 14 |
| Ilmenite | 15 | 40 | 30 | 29 |
| Asbestos | 5 |  | 5 | 5 |
| $Fe_3O_4$ | 15 |  |  |  |
|  | 100 | 100 | 100 | 100 |

The materials must be very thoroughly mixed and very finely ground. In practice the best results have been obtained by grinding the mixture and sifting the ground product so as to obtain a material in which all particles will pass a 100 mesh screen. The material is then thoroughly mixed in an ordinary mixer and thereafter liquid sodium silicate is incorporated with it in sufficient quantity to make a stiff plastic product. The best results have been obtained with sodium silicate of 40° Baumé or 1.38 specific gravity. The proportion of the sodium silicate may vary somewhat according to the plasticity desired in the product. For the compositions set forth in columns 1, 2 and 3 of the above table, the sodium silicate may be used in the proportion of 350 parts of it to 1000 parts of the dry mixture, but for the composition set forth in column 4 it is generally advantageous to use more sodium silicate, for example, up to 430 parts of it to 1000 parts of the dry mixture.

The resultant plastic material finally obtained in accordance with the above description is readily applied to the core rod by the usual extrusion process, but greatly improved results are obtained when high pressures are applied to the plastic material during extrusion, as can be done with more modern types of extrusion presses.

After being coated, the welding rod is dried, and this can be done in an ordinary drier, where the coating has been applied with high pressures, without an undue loss of rods by cracking or blistering of the coating. Where the high pressure was not used during extrusion, or where the coating is applied by a dipping process, it is advantageous to dry slowly in a special humid atmosphere in which the moisture is maintained at least as high as 70 percent of saturation and the temperature at about 85° F.

It has been found necessary when using the compositions set forth above to apply a relatively thick coating and, in the best embodiments, the cross-sectional area of the coating should be about 40 to 50 percent of the cross-sectional area of the core rod.

Welding rods made in accordance with the present invention have given highly satisfactory results in operation, as well as a high grade of weld metal and a brittle and readily removable slag. The deposit of weld metal is fine grained, and, in general, shows a grain finer than that of the core metal. Repeated tests in welding in the three positions, namely, flat, vertical and overhead, show that the welding electrode of the present invention gave in all cases weld metal tensile test specimens whose yield points were 60,000 pounds per square inch or better, and ultimate tensile strengths of 72,000 pounds per square inch or better. The elongation exceeded 20 percent in two inches. All of these specimens were tests in the condition as deposited, that is, unannealed and made up entirely of the deposited metal. The weld metal obtained with bare rods substantially identical with the core metal of this invention, will show slight, if any, yield point, and an ultimate tensile strength of not more than 58,000 pounds per square inch, the elongation being not much over 8 percent in two inches.

In operation the amperages at which this electrode produces the best results vary with the diameter of the rod, and are as follows:

|  | Amperes |
|---|---|
| 3/32 inch diameter | 90 |
| 1/8 inch diameter | 100 |
| 5/32 inch diameter | 130 |
| 3/16 inch diameter | 170 |
| 1/4 inch diameter | 250 |

The voltages employed range from 20 volts to 30 volts.

Chemical analyses of the samples of weld metal deposited by the electrodes of this invention, on a steel plate having a carbon content of 0.17, showed the following:

| Carbon | 0.08 to 0.09 |
|---|---|
| Manganese | 0.35 to 0.45 |
| Silicon | 0.12 to 0.20 |

While a comparison of the analysis of the core, hereinbefore given, with the above analyses of the weld metal, shows that there has been a slight burning out of the carbon, it is to be noted that the manganese content has been well maintained and there has been a slight increase of silicon, this being supplied by the coating, which amount of silicon adds to the ductility and strength of the weld metal.

Although the best results are attained with a core metal of the composition given hereinbefore, the coating may be used to advantage with other core metals.

It will be understood that ilmenite is an ore containing a considerable percentage of titanium, usually about 30 to 50 percent. It is possible that this has the effect of protecting the molten weld metal from the action of the nitrogen of the air, and thus avoids the formation of nitrides, but whether this is true or not, it has been found that in combination with the other materials hereinbefore pointed out, a very much stronger weld metal is obtained than when the titanium is omitted.

What is claimed is:

1. A welding electrode consisting of a ferrous metal core and a coating thereon, said coating containing between about 10 and 25 percent of silicon dioxide and between about 15 and 40 percent of ilmenite, the sum of these two ingredients ranging between about 40 and 55 percent, said coating also containing between about 14 and 20 percent of manganese dioxide, also between about 14 and 20 percent of ferromanganese, also between about 10 and 14 percent of cellulose, and a binder.

2. A welding electrode consisting of a ferrous metal core and a coating thereon, said coating containing between about 10 and 25 percent of silicon dioxide and between about 15 and 40 percent of ilmenite, the sum of these two ingredients ranging between about 40 and 55 percent, said coating also containing between about 14 and 20 percent of manganese dioxide, also between about 14 and 20 percent of ferromanganese, also between about 10 and 14 percent of cellulose, about 4 to 6 percent of asbestos, and a binder.

3. A welding electrode consisting of a ferrous metal core and a coating thereon, said coating containing between about 10 and 25 percent of silicon dioxide and between about 15 and 40 percent of ilmenite, the sum of these two ingredients ranging between about 40 and 55 percent of the weight of the ingredients of the coating, said coating also containing between about 14 and 20 percent of manganese dioxide, also between about 14 and 20 percent of ferromanganese, also between about 10 and 14 percent of cellulose, also between 12 and 16 percent of black oxide of iron, also between about 4 to 6 percent of asbestos, and a binder.

4. A welding electrode consisting of a metal core and a coating thereon, said coating consisting of a mixture of the following materials in substantially the following proportions by weight based on their own total, namely,

| | Per cent |
|---|---|
| $SiO_2$ | 24 |
| $MnO_2$ | 14 |
| Ferromanganese | 14 |
| Cellulose | 14 |
| Ilmenite | 29 |
| Asbestos | 5 | said coating also containing a binder.

5. A welding electrode consisting of a ferrous metal core and a coating thereon, said coating containing between 10 and 25 percent of silicon dioxide and between 15 and 40 percent of ilmenite, the percentage of ilmenite varying inversely with the silicon dioxide.

6. A welding electrode consisting of a ferrous metal core and a coating thereon, said coating containing between 10 and 25 percent of silicon dioxide and between 15 and 40 percent of ilmenite, the sum of these two ingredients ranging between about 40 and 55 percent, said coating also containing essential amounts of manganese dioxide, ferro-manganese, cellulose, and a binder.

ROBERT S. JOHNSTON.